(12) United States Patent
Chen

(10) Patent No.: US 8,467,182 B2
(45) Date of Patent: Jun. 18, 2013

(54) DOCKING STATION

(75) Inventor: Hsiao-Chang Chen, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 13/337,844

(22) Filed: Dec. 27, 2011

(65) Prior Publication Data

US 2013/0128449 A1    May 23, 2013

(30) Foreign Application Priority Data

Nov. 23, 2011  (CN) .................................. 100142900

(51) Int. Cl.
*H05K 5/00* (2006.01)
*H05K 7/00* (2006.01)

(52) U.S. Cl.
USPC ............ 361/679.41; 361/679.42; 361/679.43; 361/679.44

(58) Field of Classification Search
USPC .............. 361/679.41, 679.42, 679.43, 679.44
See application file for complete search history.

(56) References Cited

U.S. PATENT DOCUMENTS

| | | | | |
|---|---|---|---|---|
| 6,259,601 | B1 * | 7/2001 | Jaggers et al. | 361/690 |
| 6,741,462 | B2 * | 5/2004 | Kamphuis et al. | 361/679.02 |
| 7,633,750 | B2 * | 12/2009 | Fan et al. | 361/679.43 |
| 8,189,330 | B2 * | 5/2012 | Hung et al. | 361/679.43 |
| 8,373,984 | B2 * | 2/2013 | Lin et al. | 361/679.41 |
| 2007/0070598 | A1 * | 3/2007 | Chuang | 361/686 |

* cited by examiner

*Primary Examiner* — Anthony Haughton
(74) *Attorney, Agent, or Firm* — J.C. Patents

(57) ABSTRACT

A docking station including a housing and a linkage mechanism is provided. The housing has a supporting-surface and an inner-surface opposite to each other, in which the supporting-surface is suitable to support an electronic apparatus. The linkage mechanism includes a sliding-member disposed on the inner-surface, at least one latching-member slidably coupled to the sliding-member and a connector disposed on the sliding-member. The sliding-member slides back-and-forth along a sliding-path to bring the latching-member sliding back-and-forth along the sliding-path. The travel distance of the sliding-member on the sliding-path is greater than the travel distance of the latching-member on the sliding-path. The connector slides with the sliding-member and is protruded out of or hidden into the housing. The latching-member locks or unlocks the electronic apparatus and the connector is connected to or separated from the electronic apparatus with the sliding of the sliding-member.

10 Claims, 4 Drawing Sheets

DOCKING STATION

CROSS-REFERENCE TO RELATED APPLICATION

This application claims the priority benefit of Taiwan application serial no. 100142900, filed Nov. 23, 2011. The entirety of the above-mentioned patent application is hereby incorporated by reference herein and made a part of this specification.

BACKGROUND OF THE INVENTION

1. Field of the Invention

The invention generally relates to a docking station, and more particularly, to a docking station with a linkage mechanism.

2. Description of Related Art

In order to facilitate the user to carry electronic products, the volumes thereof are made smaller and smaller, but certain features are thereby removed. In order to restore or extend the functionality of electronic products, equipping with expansion accessories is a common choice. The expansion accessories when in use are connected to the electronic products, while, when not in use, they are detached from the electronic products. Therefore, the expansion accessories allow the electronic products in the use having greater flexibility.

For example, notebook computers, due to the consideration of their portability, are designed towards the light-slim-short-small figure, and therefore some components and their functions, such as independent display chip and optical drives will usually be removed in order to create its thin body. In contrast, in order to make the notebook computer still have a chance to play more performances in a particular circumstance, the solution mostly is to employ a docking station so that the notebook computer can be detachably combined with the docking station to provide the notebook with extra functions.

However, when the notebook computer is placed on the docking station, usually a moving mechanism is used to make the connector of the docking station and the latching-member connected to the notebook computer. While, the currently available moving mechanism has inconsistent actuating travels or the friction between the parts thereof is excessive, the connector of the docking station and the latching-member are often asynchronous with each other.

SUMMARY OF THE INVENTION

Accordingly, the invention is directed to a docking station with better linking effect.

The invention provides a docking station, which includes a housing and a linkage mechanism. The housing has a supporting-surface and an inner-surface opposite to each other, in which the supporting-surface is suitable to support an electronic apparatus. The linkage mechanism includes a sliding-member, a pair of latching-members and a connector. The sliding-member is slidably disposed on the inner-surface and slides back-and-forth along a sliding-path. The latching-members are slidably coupled to the sliding-member and following the sliding-member to slide back-and-forth on the sliding-path so as to lock or unlock the electronic apparatus, in which the travel distance of the sliding-member on the sliding-path is greater than the travel distance of the latching-member on the sliding-path. The connector is disposed on the sliding-member, following the sliding-member to slide and protruded out of or hidden into the supporting-surface so as to be connected to or separated from the electronic apparatus.

In an embodiment of the present invention, the above-mentioned housing has a plurality of first guiding-blocks and a plurality of second guiding-blocks located on the inner-surface, the sliding-member has a first guiding-groove corresponding to the first guiding-blocks, the latching-members respectively have a second guiding-groove corresponding to each of the second guiding-blocks, and through the mutual fittings between the first guiding-blocks and the first guiding-groove and between the second guiding-blocks and the second guiding-grooves, the sliding-member and the latching-members slide back-and-forth along the sliding-path.

In an embodiment of the present invention, the above-mentioned first guiding-block and the above-mentioned second guiding-block respectively includes a bolt, at least one protruded-pillar and a fastener. The bolt is fixed on the inner-surface of the housing. The protruded-pillar is uprightly disposed at the outer edge of the bolt, in which the height of the protruded pillar relatively to the inner surface is higher than the height of the sliding-member relatively to the inner-surface. The fastener is fastened at the bolt and leans against the protruded-pillar.

In an embodiment of the present invention, the above-mentioned first guiding-block further includes at least one rib uprightly disposed on the inner-surface and extending along the sliding-path, in which the sliding-member is slidably supported on the rib, so that the distance of the sliding-member from the inner-surface is greater than the distance of the latching-member from the inner-surface.

In an embodiment of the present invention, the above-mentioned at least one rib includes a pair of ribs and the above-mentioned bolt is adjacent to and between the pair of the ribs.

In an embodiment of the present invention, the above-mentioned at least one latching-member includes a pair of latching-members coupled to both opposite ends of the sliding-member along the sliding-path, each of the latching-members has a hook protruded out of the supporting-surface, and the sliding-member brings the latching-members sliding back-and-forth along the sliding-path so as to drive the hooks locking or unlocking the electronic apparatus.

In an embodiment of the present invention, the above-mentioned sliding-member further has a third guiding-groove and the latching-member further includes a third guiding-block, slidably coupled to the third guiding-groove, in which the length of the third guiding-groove along the sliding-path is greater than the length of the third guiding-block along the sliding-path.

In an embodiment of the present invention, the above-mentioned third guiding-groove is divided into a buffer section and at least one driving section, the width of the buffer section along an axis is greater than the width of the third guiding-block along the axis and the axis is perpendicular to the sliding-path.

In an embodiment of the present invention, the above-mentioned width of the driving section along the axis and the width of the third guiding-block along the axis form an interference fit.

In an embodiment of the present invention, the above-mentioned third guiding-groove is divided into a buffer section and two driving sections disposed along the sliding-path and the buffer section is located between the driving sections.

Based on the description above, in the above-mentioned embodiment of the invention, since the travel distance of the sliding-member is greater than the travel distance of the latching-member, the linkage mechanism allows the sliding-member moving a certain distance, then pushing the latching-members to move. In this way, the invention is able to make both the latching-members and the connector simultaneously connected to the electronic apparatus located on the docking station.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
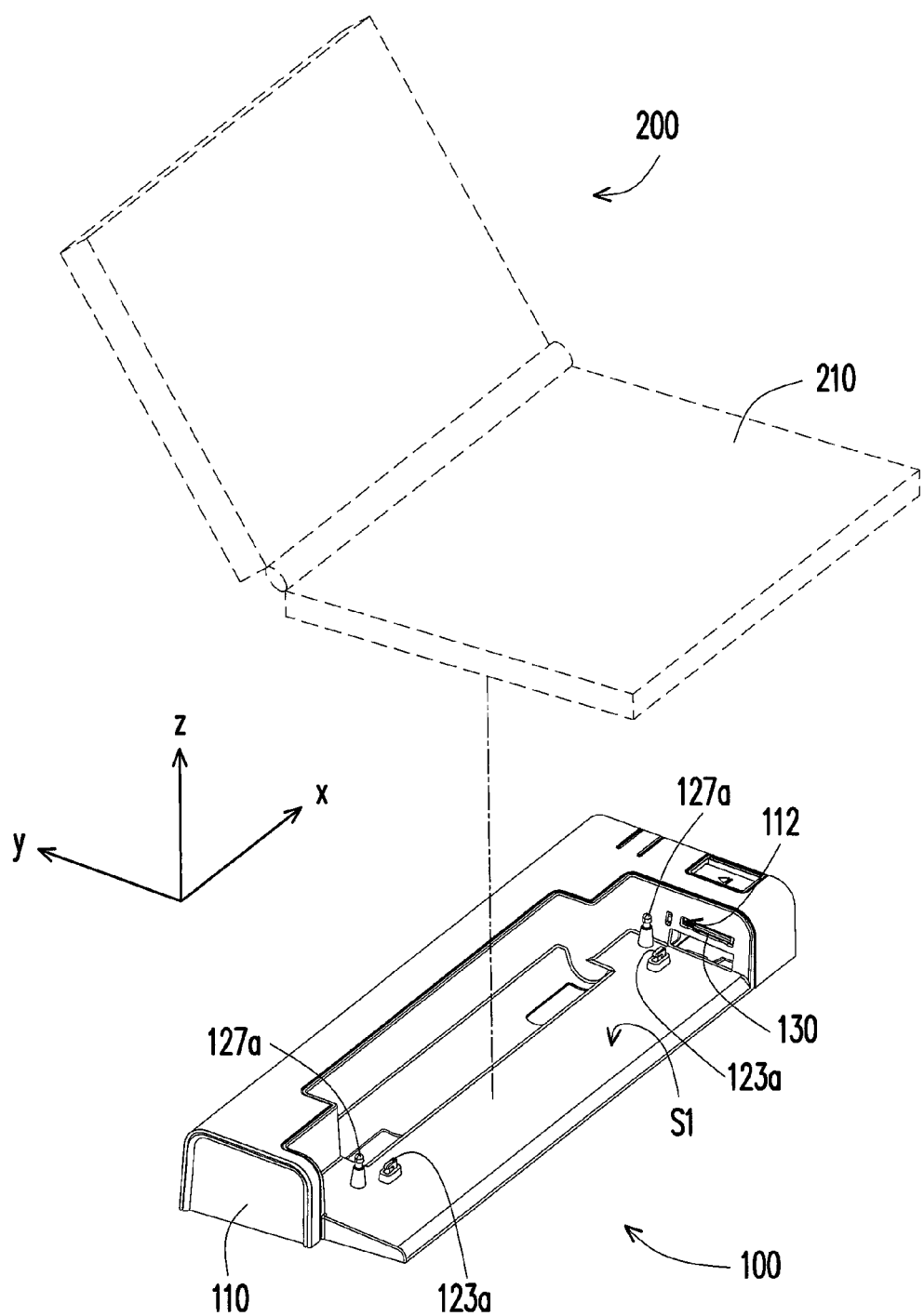
FIG. 1 is a schematic diagram of a docking station according to an embodiment of the invention.
Figure 2:
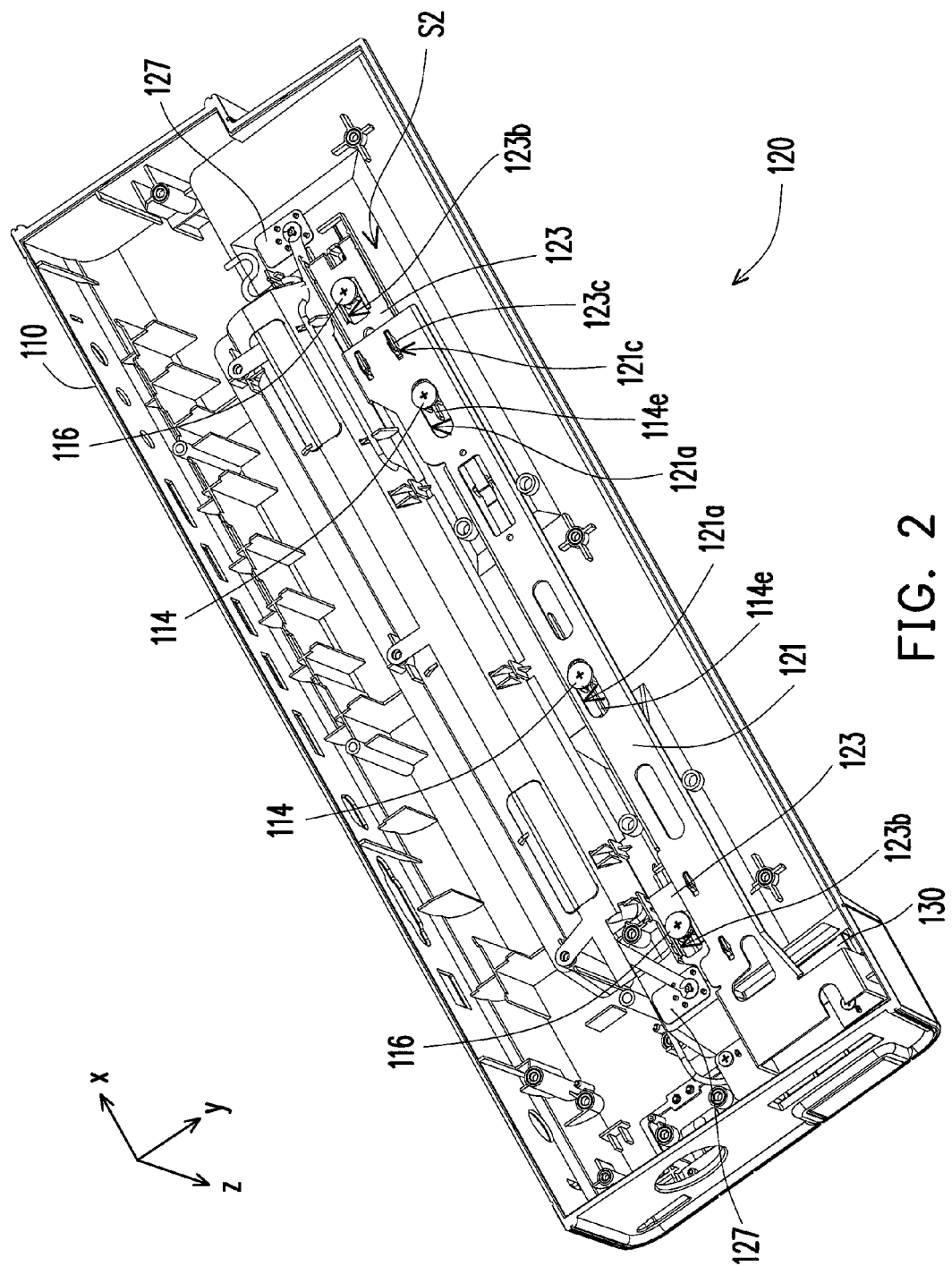
FIG. 2 is a schematic diagram of the docking station of FIG. 1 in another angle of view.

FIG. 1 is a schematic diagram of a docking station according to an embodiment of the invention and FIG. 2 is a schematic diagram of the docking station of FIG. 1 in another angle of view. In order to more clearly identify the parts related to the linkage mechanism inside the docking station, some structures of the docking station in FIG. 2 are omitted. In FIG. 1, a Cartesian coordinates is defined, which serves as a description reference system for the moving of the related parts. Referring to FIGS. 1 and 2, in the embodiment, a docking station 100 is configured for supporting an electronic apparatus 200, for example, a notebook computer. When the electronic apparatus 200 is placed at and supported by the docking station 100, the docking station 100 is electrically connected to the electronic apparatus 200 to advance or increase the function and the efficiency of the electronic apparatus 200 through the related components of the docking station 100. However the invention is not limited to the above-mentioned docking station 100. In fact, the invention is also applied in any object able to support and electrically connect the electronic apparatus 200.

In the embodiment, the docking station 100 includes a housing 110, a linkage mechanism 120 and a connector 130. The housing 110 has a supporting-surface S1 and an inner-surface S2 opposite to each other, in which the profile of the supporting-surface S1 conforms to the profile of the electronic apparatus 200 for supporting the electronic apparatus 200. The major portion of the linkage mechanism 120 is disposed on the inner-surface S2 of the housing 110. The connector 130 is disposed on the linkage mechanism 120. When the electronic apparatus 200 is supported on the supporting-surface S1 of the housing 110, the electronic apparatus 200 is able to drive the linkage mechanism 120 so that the electronic apparatus 200 and the docking station 100 are locked together by each other and electrically connected to each other through the connector 130.

The linkage mechanism 120 includes a sliding-member 121, a pair of latching-members 123 and a driving module 127. The sliding-member 121 and the latching-members 123 can be slidably disposed on the inner-surface S2 of the housing 110, the latching-members 123 are respectively slidably coupled to both opposite ends of the sliding-member 121, and each of the latching-members 123 has a hook 123a protruded out of the supporting-surface S1. The connector 130 is fixed at a side of the sliding-member 121 and goes out of the supporting-surface S1 through a port opening 112 on the supporting-surface S1 or is hidden into the supporting-surface S1. The driving module 127 is connected to the sliding-member 121 and has a pressing pillar 127a protruded out of the supporting-surface S1.

When the electronic apparatus 200 moves along the Z-axis and leans against the supporting-surface S1, the host 210 of the electronic apparatus 200 would press the pressing pillar 127a so that the driving module 127 brings the sliding-member 121 sliding along the X-axis (i.e., the latching-members 123 in the embodiment are slidably coupled to both opposite ends of the sliding-member 121 along the X-axis, and all the sliding-member 121, the latching-members 123 and the connector 130 take the X-axis as their sliding-paths). At the time, the latching-members 123 and the connector 130 are linkage members through the sliding-member 121, such that the connector 130 moves with the sliding-member 121 and out of the port opening 112 to electrically connect the host 210.

It should be noted that the travel distance of the sliding-member 121 on the X-axis is greater than the travel distance of each of the latching-members 123 on the X-axis. In other words, the sliding-member 121 brings the latching-members 123 to slide along the X-axis after the sliding-member 121 slides a certain distance along the X-axis first. As a result, the difference of the travel distances between the sliding-member 121 (that the connector 130 fixed thereon) and the latching-members 123 overcomes the problem that both the connector 130 and the hooks 123a are connected to the host 210 of the electronic apparatus 200 at different moments which is caused by the figures and dimensions of the parts or the disposing positions thereof. Instead of above problems, the connector 130 and the latching-members 123 are connected to the electronic apparatus 200 simultaneously.

Figure 3:
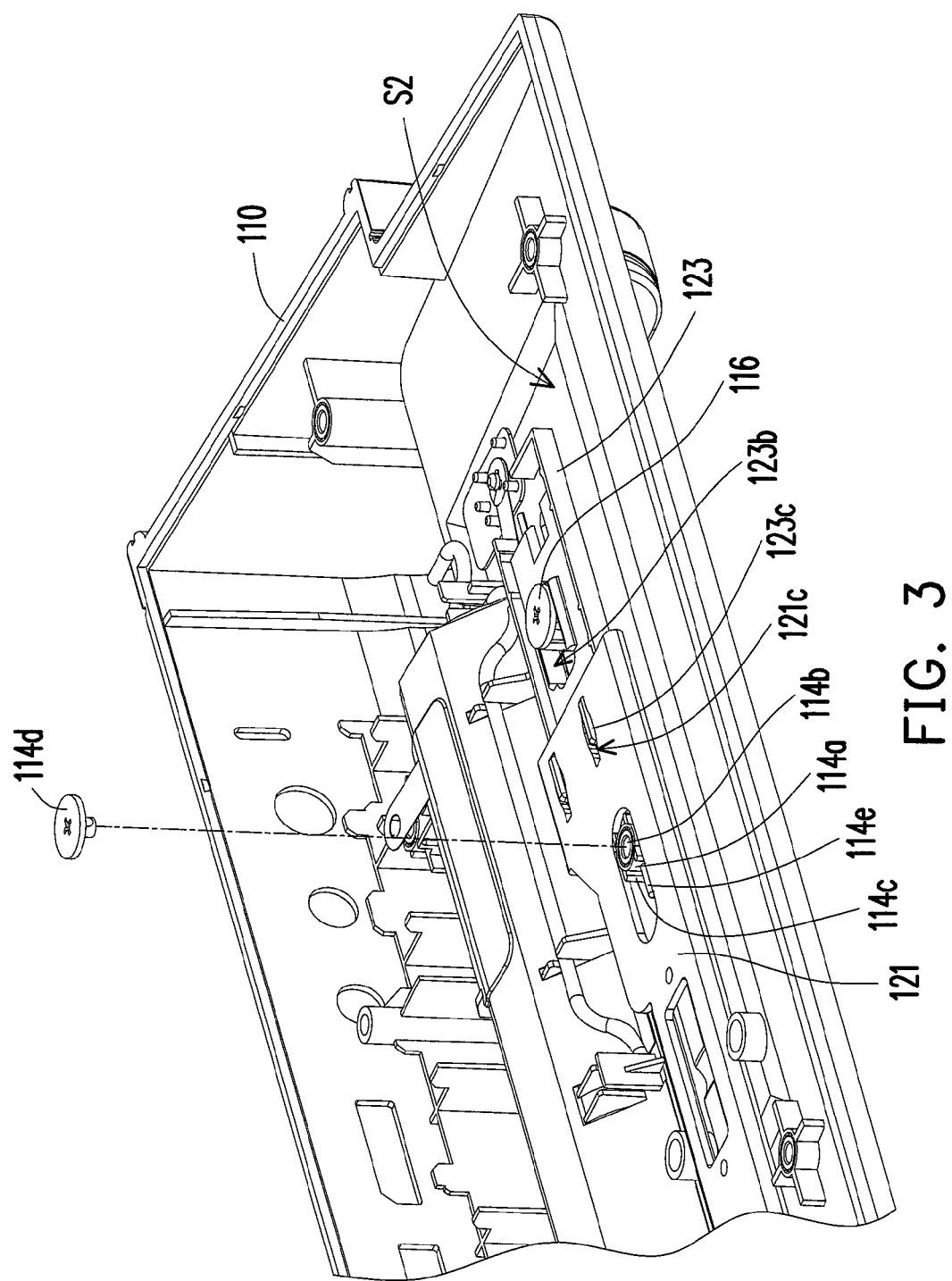
FIG. 3 is a local enlargement diagram of the docking station of FIG. 2.

FIG. 3 is a local enlargement diagram of the docking station of FIG. 2, wherein some parts are exploded for better explanation. Referring to FIGS. 2 and 3, in more details, the housing 110 has a plurality of first guiding-blocks 114 and a plurality of second guiding-blocks 116 located on the inner-surface S2. The sliding-member 121 and the latching-members 123 respectively have a first guiding-groove 121a and a second guiding-groove 123b. The first guiding-blocks 114 are coupled into the first guiding-groove 121a and the second guiding-blocks 116 are coupled into the second guiding-groove 123b, so that the sliding-member 121 and the latching-members 123 can slide back-and-forth along the X-axis relatively to the housing 110.

In the embodiment, the first guiding-blocks 114 and the second guiding-blocks 116 have the same structures, so takes the first guiding-blocks 114 for example. In the embodiment, each of the first guiding-blocks 114 includes a bolt 114a, a copper stud 114b, a plurality of protruded-pillars 114c and a fastener 114d, in which both the bolt 114a and the protruded-pillars 114c are uprightly disposed on the inner-surface S2 of the housing 110 and the protruded-pillars 114c surround and are adjacent to the outer edge of the bolt 114a. The copper stud 114b is welded into the bolt 114a and the fastener 114d is fastened at the copper stud 114b and leans against the protruded-pillars 114c. Since the height of each of the protruded-pillars 114c relatively to the inner-surface S2 is greater than the height of the top of the bolt 114a relatively to the inner-surface S2, the fastener 114d is supported on the protruded-pillars 114c when the fastener 114d is fastened at the copper stud 114b, and the interference between the fastener 114d and the sliding-member 121 is avoided. The sliding-member 121 is position-limited on the inner-surface S2 of the housing 110 and the degree of freedom of the sliding-member 121 sliding along the sliding-path is maintained.

Each of the first guiding-blocks 114 further has a rib 114e, which is uprightly disposed on the inner-surface S2, extends along the X-axis and is adjacent to the bolt 114a. The sliding-member 121 is substantially and slidably supported on the rib 114e, such that the height of the sliding-member 121 relatively to the inner-surface S2 is greater than the height of each of the latching-members 123 relatively to the inner-surface S2. Meanwhile, due to the line contact structure feature between the sliding-member 121 and the rib 114e, it is avoided that the sliding efficiency of the sliding-member 121 is limited because of too large contact area between the sliding-member 121 and the inner-surface S2 of the housing 110. In addition, the sliding-member 121 further has a pair of third guiding-grooves 121c and each of the latching-members 123 further has a pair of third guiding-blocks 123c, in which the third guiding-blocks 123c are respectively coupled into the third guiding-grooves 121c, such that the sliding-member 121 slides relatively to the latching-members 123 along the X-axis. Further, the length of the third guiding-groove 121c along the X-axis is greater than the length of the third guiding-block 123c along the X-axis. Besides, the width of each of the third guiding-grooves 121c along the Y-axis at the middle thereof is greater than the width of each of the third guiding-blocks 123c along the Y-axis.

Figure 4:
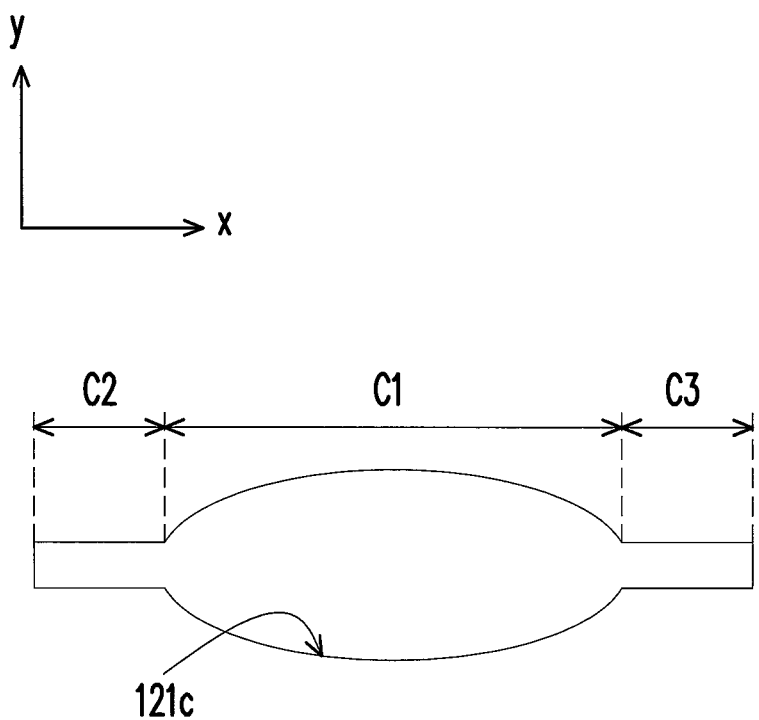
FIG. 4 is a local top-view diagram of the docking station of FIG. 3.

FIG. 4 is a local top-view diagram of the docking station of FIG. 3 for describing the related structure of the third guiding-grooves 121c. Referring to FIGS. 3 and 4, each of the third guiding-grooves 121c is divided into a buffer section C1 and two driving sections C2 and C3 respectively connecting the both ends of the buffer section C1. The buffer section C1 and the driving sections C2 and C3 are disposed along the X-axis, in which the width of the buffer section C1 along the Y-axis is greater than the width of the driving section C2 or C3 along the Y-axis. That is to say, when the third guiding-block 123c is located at the driving section C2 or C3, the interference extent between the third guiding-block 123c and the third guiding-groove 121c is greater than the interference extent between the third guiding-block 123c and the third guiding-groove 121c where the third guiding-block 123c is located at the buffer section C1, which means when the third guiding-block 123c is located at the driving section C2 or C3, the third guiding-block 123c and the width of the third guiding-groove 121c along the Y-axis form an interference fit, but there is no interference fit when the third guiding-block 123c is located at the buffer section C1. In this way, when the third guiding-block 123c moves at the buffer section C1, the sliding-member 121 would not drive the latching-members 123 to slide, while when the third guiding-blocks 123c are located at the driving section C2 or C3, the sliding-member 121 can drive the latching-members 123 to slide so as to cause a route difference between the sliding-member 121 and the latching-members 123.

In summary, in the above-mentioned embodiment of the invention, since the travel of the sliding-member is greater than the travels of the latching-members, the linkage mechanism allows the sliding-member moving a certain distance, then pushing the latching-members to move, i.e., there is a buffer distance for the sliding-member relatively to the latching-members during the sliding. In this way, the invention is able to make both the latching-members and the connector simultaneously connected to the electronic apparatus located on the docking station.

In addition, by the design to create a difference between the width of the third guiding-groove and the width of the third guiding-block in the linkage mechanism, the third guiding-groove is divided into a buffer section located at the middle thereof and two driving sections at both sides of the buffer section, so that when sliding-member is moving through the above-mentioned buffer distance, the third guiding-block is substantially coupled into and sliding in the buffer section. In this way, in addition to creating a travel difference between the sliding-member and the latching-members, the friction between the sliding-member and the latching-members is effectively reduced, which is able to avoid the sliding-member moving through the buffer distance from bringing the latching-members to move.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A docking station, comprising:
    a housing, having a supporting-surface and an inner-surface opposite to each other, wherein the supporting-surface is suitable to support an electronic apparatus;
    a linkage mechanism, comprising:
        a sliding-member, slidably disposed on the inner-surface and sliding back-and-forth along a sliding-path;
        at least one latching-member, slidably coupled to the sliding-member and following the sliding-member to slide back-and-forth on the sliding-path so as to lock or unlock the electronic apparatus, wherein the travel distance of the sliding-member on the sliding-path is greater than the travel distance of the latching-member on the sliding-path; and
    a connector, disposed on the sliding-member, following the sliding-member to slide and protruded out of or hidden into the supporting-surface so as to be connected to or separated from the electronic apparatus.

2. The docking station as claimed in claim 1, wherein the housing has a first guiding-block and a second guiding-block located on the inner-surface, the sliding-member has a first guiding-groove corresponding to the first guiding-block, the latching-member has a second guiding-groove corresponding to the second guiding-block, and through the mutual fittings between the first guiding-block and the first guiding-groove and between the second guiding-block and the second guiding-groove, the sliding-member and the latching-member slide back-and-forth on the inner-surface of the housing along the sliding-path.

3. The docking station as claimed in claim 2, wherein the first guiding-block and the second guiding-block respectively comprise:
    a bolt, fixed on the inner-surface of the housing;
    at least one protruded-pillar, uprightly disposed at the outer edge of the bolt, wherein the height of the protruded pillar relatively to the inner surface is higher than the height of the sliding-member or the latching-member relatively to the inner-surface; and
    a fastener, fastened at the bolt and leaning against the protruded-pillar.

4. The docking station as claimed in claim 3, wherein the first guiding-block further comprises:
    at least one rib, uprightly disposed on the inner-surface and extending along the sliding-path, wherein the sliding-member is slidably supported on the rib, so that the distance of the sliding-member from the inner-surface is greater the distance of the latching-member from the inner-surface.

5. The docking station as claimed in claim 4, wherein the at least one rib comprises a pair of ribs and the bolt is adjacent to and between the pair of the ribs.

6. The docking station as claimed in claim 1, wherein the at least one latching-member comprises a pair of latching-members coupled to both opposite ends of the sliding-member along the sliding-path, each of the latching-members has a hook protruded out of the supporting-surface, and the sliding-member brings the latching-members sliding back-and-forth along the sliding-path so as to drive the hooks locking or unlocking the electronic apparatus.

7. The docking station as claimed in claim 1, wherein the sliding-member further has a third guiding-groove and the latching-member comprises:
  a third guiding-block, slidably coupled to the third guiding-groove, wherein the length of the third guiding-groove along the sliding-path is greater than the length of the third guiding-block along the sliding-path.

8. The docking station as claimed in claim 7, wherein the third guiding-groove is divided into a buffer section and at least one driving section, the width of the buffer section along an axis is greater than the width of the third guiding-block along the axis and the axis is perpendicular to the sliding-path.

9. The docking station as claimed in claim 8, wherein the width of the driving section along the axis and the width of the third guiding-block along the axis form an interference fit.

10. The docking station as claimed in claim 8, wherein the third guiding-groove is divided into a buffer section and two driving sections and the buffer section is located between the driving ends.

\* \* \* \* \*